Feb. 20, 1951 W. C. EVANS ET AL 2,542,803
RAILWAY ELECTRONIC SAFETY CONTROL SYSTEM
Filed Nov. 13, 1945
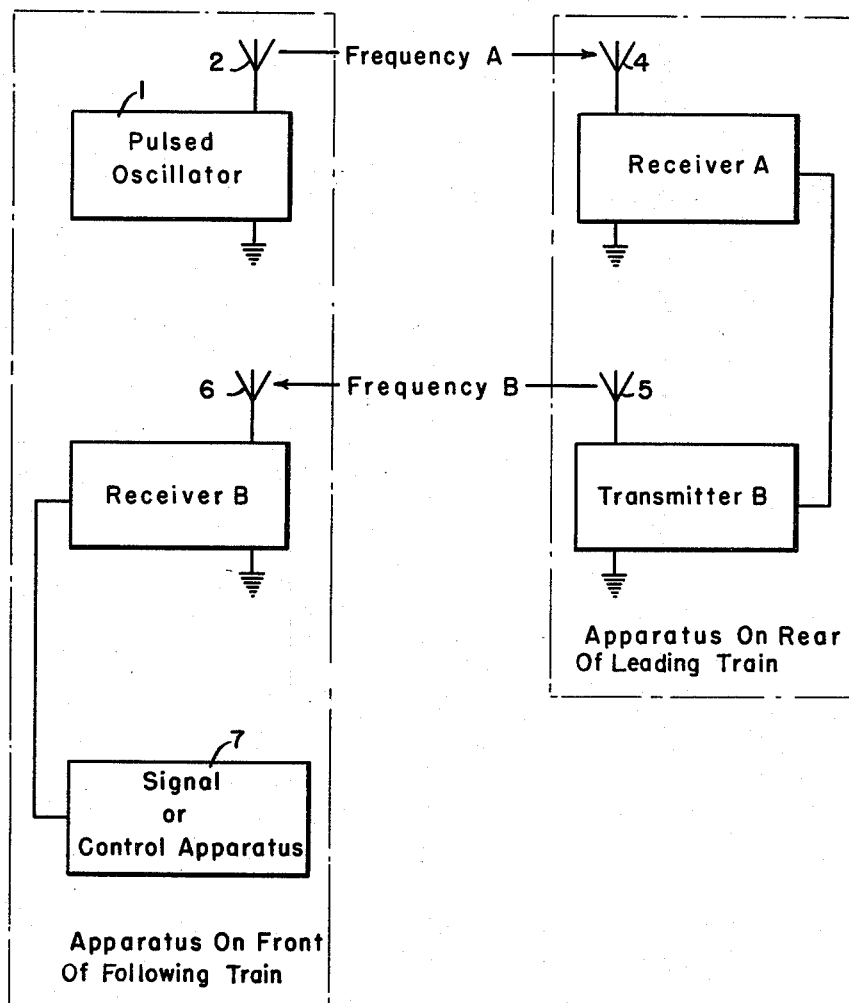
WITNESSES:
INVENTORS
Walter C. Evans and
Forrest S. Mabry.
BY
ATTORNEY Patented Feb. 20, 1951

2,542,803

UNITED STATES PATENT OFFICE 2,542,803

RAILWAY ELECTRONIC SAFETY CONTROL SYSTEM

Walter C. Evans and Forrest S. Mabry, Baltimore, Md., assignors to Westinghouse Electric Corporation, East Pittsburgh, Pa., a corporation of Pennsylvania Application November 13, 1945, Serial No. 628,287

4 Claims. (Cl. 343—7.)

1

Our invention relates to vehicle control systems, and, in particular, relates to systems in which radiant energy is employed to operate warning signals or control devices on one vehicle when it approaches within a dangerous distance of a second vehicle.

One object of our invention is to provide a vehicle control system in which means for transmitting radiant energy located on one vehicle cause the emission of radiant energy from a second vehicle occupying a position in the path of the first vehicle which is picked up by proper responsive means on the first vehicle and caused to operate warning signals or other control devices thereon.

Another object of our invention is to provide a system of vehicle control in which a directed beam of radiant energy sent out by a first vehicle causes the emanation of radiant energy from a second vehicle in the path of the first vehicle, and the emanated radiant energy operates signal devices or control apparatus on the first vehicle.

A further object of our invention is to provide a vehicle control system in which radiant energy having a frequency or other identifying characteristic is emitted from a first vehicle and upon reception by a second vehicle positioned in the path of the first vehicle causes the emanation therefrom of radiant energy to operate signal or control devices.

Still another object of our invention is to provide a vehicle control system in which pulsed radiant energy emitted from a first vehicle causes a second vehicle so operating that there is danger of collision between the two vehicles to emanate radiant energy, when the two trains are within a predetermined distance of each other, thereby causing the operation on the first train of signal or control devices.

Other objects of our invention will become apparent upon reading the following description taken in connection with the drawings, in which the single figure is a schematic diagram of one form of a train control system embodying the principles of our invention.

Referring in detail to the drawing, there is positioned on a moving vehicle, such as a railroad train, and preferably at the front end thereof a means 1 of emanating radiant energy, such, for example, as electromagnetic waves or supersonic sound waves. For instance, the means 1 may comprise a radio transmitter of a type well known in the art which is capable of sending out ultra high frequency waves, say of the frequency of 500 megacycles or more, from an antenna 2. For

2 many purposes it will be preferable that the output of the means 1 shall be intermittently pulsed at regular intervals. Devices for emanating radiant energy in intermittent pulses are well known in the art; for example, in the case of a radio transmitter, the output circuit may embody an electronic tube having a control electrode on which is impressed a square-topped periodic wave which renders it conductive during, let us say, the positive portion of the wave period and non-conductive during the negative portion. Generators of such square-topped waves are well known in the radio art; for example, such generators are described in paragraph 33 of chapter 13 of the Radio Engineer's Handbook by Terman, first edition, McGraw-Hill Book Company, New York, 1943.

The antenna 2 is preferably made of a highly directional type, such as are well known in the short-wave radio field today. Where the antenna 2 is of the directional type, the beam of energy is preferably directed along the intended path of travel of the train or vehicle.

Each vehicle or train is likewise provided with means for receiving radiant energy of the type emanating from the means 1, and for translating this energy into control currents. Such receiving devices are too well known in the art to require extended description; for example, an ordinary radio receiver A having an antenna 4 and capable of demodulating the pulses of short radio waves may be used in the case of the short waves emanated by the antenna 2. The receiver A may be tuned to receive only energy of the frequency emanating from the means 1, and the antenna 4 may, if desired, be made of the directional type in which case it is arranged to selectively receive energy traveling in the same direction as the vehicle or train on which it is positioned. The preferred position for the antenna 4 is at the rear of the second vehicle or train.

The receiver A is so arranged that its output current causes a transmitter B to begin the emanation of radiant energy whenever the receiver A responds to the reception of energy emanating from the source 1 and to continue such emanation only as long as such reception continues. The energy transmitted from the transmitter B may be of any type of radiation, such as those mentioned above in connection with means 1, but preferably its radiation has some characteristic capable of distinguishing it from the output of means 1. For example, it may be high frequency radio waves differing somewhat in wave length but in the same broad range as that mentioned above in connection with means 1. The transmitter B may be provided with a radiator 5, such as an antenna which will radiate energy in the direction of the train on which the means 1 is located.

The train on which the means 1 is located is provided, preferably at its front end with a receiver B capable of translating energy of the type emitted by the transmitter B into control currents. Arrangements are provided adjacent the receiver B so that its control currents can energize a signalling device or some form of control apparatus, such as a brake-setting means on the vehicle carrying the receiver B. Such signals and brake-setting devices and their operation by control currents are too well known in the art to require detailed description here.

To take a specific instance, the receiver B may be a radio receiver selectively responsive to radio waves of a frequency B sent out by the antenna 5, and may be provided with a suitable receiving antenna 6. It will be desirable in many instances that the receiving antenna 6 shall be of the directional type selective to energy transmitted along the path of movement of the vehicle or train carrying it. The receiver B may be an ordinary radio receiver selectively responsive to radio waves of the frequency B.

Where the antenna 2 sends out radiant energy in intermittent pulses, as above described, the receiver B may be provided with means well known in the art so that it is responsive to receive energy from transmitter B for only a predetermined time after the antenna 2 begins to send out a given pulse. The receiver B may be given the last mentioned characteristic by incorporating in its electrical circuits an electronic tube having a control grid on which is impressed a square-topped energy pulse of fixed duration every time a pulse of energy is sent out by the source 1. For example, square-topped periodic pulses may be generated by a device, such as that described by the Terman book above mentioned, which pulse starts synchronously with the square-topped pulses described as impressed on the control grid of the pulsing tube mentioned in connection with the pulsed oscillator 1. The pulse impressed on the receiver B may be arranged, by means well known in the art, to render the receiver B capable of responding to the reception of energy received from transmitter B only during the positive period of said pulse and to leave the receiver B unresponsive to such energy during the negative period of such pulse.

In general, radiant energy emanating from the means 1 will travel at a definite velocity to the receiver A, and will cause the transmitter B immediately to transmit radiant energy at a definite velocity back to the receiver B. If the period required for the radiant energy to pursue the path just mentioned is less than the duration of the positive period of the pulse rendering the receiver B capable of responding to energy from transmitter B, the output current of receiver B will produce a signal or operate the control apparatus 7. On the other hand if the period required for the energy to pursue the above described course from means 1 to receiver A through transmitter B back to receiver B is greater than the duration of the positive period of the pulse described as rendering receiver B capable of response, the signal or control apparatus 7 will remain unresponsive to any energy emanating from means 1. Thus, if the distance of the vehicle carrying the receiver A from that carrying the receiver B is greater than a predetermined distance, the signal or control apparatus will remain unresponsive; but when the vehicle or train carrying the receiver B approaches within less than this predetermined distance of the train or a vehicle carrying transmitter B, the signal or control apparatus 7 will respond to prevent a closer approach of the two vehicles or trains. Collisions will thereby be prevented.

Where the means 1 and the receiver B are arranged for the use of the reception of pulsed radiant energy in the manner just described, it is preferable that the duration of the pulses sent out by the means 1 should be short relative to the time interval between pulses, and also relative to the time interval which will be required for energy to traverse the outgoing and return path between the vehicles, as just described, when they may approach within a dangerous distance of each other.

In many cases it will be desirable to have a plurality of vehicles or trains each equipped with a transmitting means 1, a receiver A, a transmitter B and a receiver B; and to have all such receivers A responsive to the same frequency or other radiation characteristic. In such cases the receiver A may be rendered unresponsive to the radiation of the means 1 which is located on the same vehicle by causing energization of means 1 to apply a blocking voltage to a tube interpolated in the current-path through receiver R in a manner well-known in the radio art. Use of such blocking may be needless in some cases where receiving antenna 2 is sufficiently directive to leave receiver A non-responsive to radiation from its local means 1.

While we have described a specific arrangement in which the energy output from the means 1 is pulsed in order to render the control apparatus responsive only to the approach of the two vehicles or trains within a dangerous distance of each other, this is only an ancillary, though valuable, feature of our broad invention and may be omitted in cases where the power radiated from the source 1 is so limited as to be incapable of causing response of the receiver A as long as the distance between the two vehicles is too great for danger of collision to exist.

It will be obvious to those skilled in the art that the radiant energy from means 1 may be made distinctive of a particular transmitter or train by properly coding it in ways well known in the art; and that the energy transmitted from the transmitter B may be made distinctive of a particular vehicle or train similarly by coding it. As an instance of coding methods, pulses of energy transmitted from the means 1 may be spaced at irregular intervals corresponding to some desired code, and by use of similarly coded pulses impressed on grid control tubes in the receiver A of the receiver B, either receiver A or receiver B may be made responsive only to energy sent out in pulses thus coded. Such coding systems may be made to embody some additional intelligence or information much as information is transmitted by telegram code. Coding of transmitters and receivers to transmit and respond respectively to pulses only of a predetermined time code or spacing may be used where different vehicles or trains follow parallel paths or tracks to cause the receiving apparatus to respond selectively to radiant energy sent out by vehicles on one track and not by vehicles on parallel paths or tracks.

It will be evident from a moment's consideration that where the frequency or other characteristic of energy sent out from means 1 in a beam directed ahead of all vehicles and trains differs from the energy sent out by the transmitters B directed rearwardly, there will be no danger, where two vehicles or trains approach each other while going in opposite directions along parallel paths or tracks, that the signal or control apparatus on one vehicle or train will be energized by the beam sent out ahead of the vehicle or train going in the opposite direction. However, to make this assurance doubly sure, it is within the scope of our invention that vehicles or trains running from north to south, for example, shall emanate energy both from means A and from transmitter B which has entirely different characteristics from any energy so emanated by trains running from south to north. For example, transmitters on south bound trains may operate in entirely different frequency bands than do transmitters on north bound trains. It will likewise be evident that by adopting the system just mentioned, it will be possible to operate systems in which the energy sent out by transmitter B is in no way distinguished by frequency or other characteristics from that sent out by means 1, provided directional antenna systems or the like are employed. Such directional antenna systems should be efficient enough so that the receiver B will not respond to energy directly radiated by means 1.

We claim as our invention:

1. A railway system in which trains proceeding in one direction are provided with means for projecting, only in the direction in which the train is moving, a first pulse of radiant energy having a first characteristic and with a receiver means responding only to radiation having said first characteristic approaching said receiving means in said one direction, said train being also provided with means for projecting a second pulse of radiant energy having a second characteristic in the direction opposite to said one direction and also provided with means for receiving energy having said second characteristic projected in said opposite direction, said second receiving means energizing a work device and being provided with means for rendering an operation of said work device unresponsive to incidence of energy of said second characteristic subsequent to a predetermined interval after the transmission of said first pulse; the trains moving in an opposite direction on said railway system being provided with equipment similar to that so far described except that their respective transmitters and receivers operate on radiant energy having characteristics different from said first and second characteristics.

2. In a railway system in which trains proceed on parallel tracks in two opposite directions, the trains proceeding in either one of said directions being each provided with two transmitters of radiant energy pulses which differ in timing from each other, the transmitters of one timing projecting energy only in the direction toward which the train is moving and the transmitter of the other timing radiating energy only in a direction opposite that to which the train is moving, each train being likewise provided with first receiving means responsive only to radiation having said one timing and also with a second receiving means responsive to energy having said second timing, said second receiving means controlling a work device and being provided with means for rendering the operation of said work device unresponsive to reception of energy by said second receiving means after the lapse of a predetermined interval following projection of energy pulses of said one timing; the pulse timing at which trains moving in one direction on said railway system operate being different from the pulse timing at which trains moving in the opposite direction on said railway system operate.

3. A system according to claim 2 in which the differences in timing of the energy pulses are differences of coding of the pulses.

4. A system according to claim 2 in which the trains moving in one direction have projecting apparatus operating on different frequency bands than trains in the opposite direction.

WALTER C. EVANS.
FORREST S. MABRY.

REFERENCES CITED

The following references are of record in the file of this patent:

UNITED STATES PATENTS

| Number | Name | Date |
|---|---|---|
| 1,677,816 | Daya | July 17, 1928 |
| 2,134,716 | Gunn | Nov. 1, 1938 |
| 2,157,122 | Dunmore | May 9, 1939 |
| 2,188,213 | Williams | Jan. 23, 1940 |
| 2,339,257 | Embiricos et al. | Jan. 18, 1944 |
| 2,402,464 | Suter | June 18, 1946 |
| 2,403,755 | Rankin | July 9, 1946 |
| 2,403,527 | Hershberger | July 9, 1946 |
| 2,405,239 | Seeley | Aug. 6, 1946 |

FOREIGN PATENTS

| Number | Country | Date |
|---|---|---|
| 288,233 | Great Britain | Sept. 6, 1928 |